(12) United States Patent
DeMarco

(10) Patent No.: US 11,259,113 B2
(45) Date of Patent: Feb. 22, 2022

(54) SOUND ENHANCEMENT DEVICE FOR CELL PHONE

(71) Applicant: Chris DeMarco, Del Mar, CA (US)

(72) Inventor: Chris DeMarco, Del Mar, CA (US)

( * ) Notice: Subject to any disclaimer, the term of this patent is extended or adjusted under 35 U.S.C. 154(b) by 28 days.

(21) Appl. No.: 16/932,452

(22) Filed: Jul. 17, 2020

(65) Prior Publication Data

US 2021/0021928 A1 Jan. 21, 2021

Related U.S. Application Data

(60) Provisional application No. 62/875,361, filed on Jul. 17, 2019.

(51) Int. Cl.
| | |
|---|---|
| *H04R 1/34* | (2006.01) |
| *H04R 1/08* | (2006.01) |
| *H04M 1/03* | (2006.01) |
| *G10K 11/28* | (2006.01) |

(52) U.S. Cl.
CPC ............. *H04R 1/342* (2013.01); *G10K 11/28* (2013.01); *H04M 1/035* (2013.01); *H04R 1/08* (2013.01); *H04R 2499/11* (2013.01)

(58) Field of Classification Search
CPC .......... H04R 1/342; H04R 1/08; H04R 1/035; H04R 2499/11; H04M 1/215; G10K 11/28
USPC .................... 379/441, 447; 455/575.1, 576.6
See application file for complete search history.

(56) References Cited

U.S. PATENT DOCUMENTS

| | | | | |
|---|---|---|---|---|
| 5,517,683 | A * | 5/1996 | Collett ............... | H04M 1/0214 455/575.1 |
| 5,867,795 | A * | 2/1999 | Novis ................. | G06Q 20/353 455/566 |
| 8,428,665 | B1 * | 4/2013 | McLaughlin .......... | H04M 1/05 455/575.1 |
| 2004/0242264 | A1 * | 12/2004 | Cho .................... | H04M 1/0258 455/550.1 |

* cited by examiner

*Primary Examiner* — Tuan D Nguyen
(74) *Attorney, Agent, or Firm* — Donn K Harms

(57) ABSTRACT

A sound enhancing device for improving voice reception of a smartphone microphone is attachable to the rear surface of a smartphone opposite the surface of the smartphone having a display. The device has a deflector in a sliding engagement within a cavity of a housing moveable between a stowed position and a deployed position. A reflective curved area positioned on a first surface of the deflector captures and reflects sound waves from the voice of a user toward a microphone of the smartphone.

16 Claims, 5 Drawing Sheets

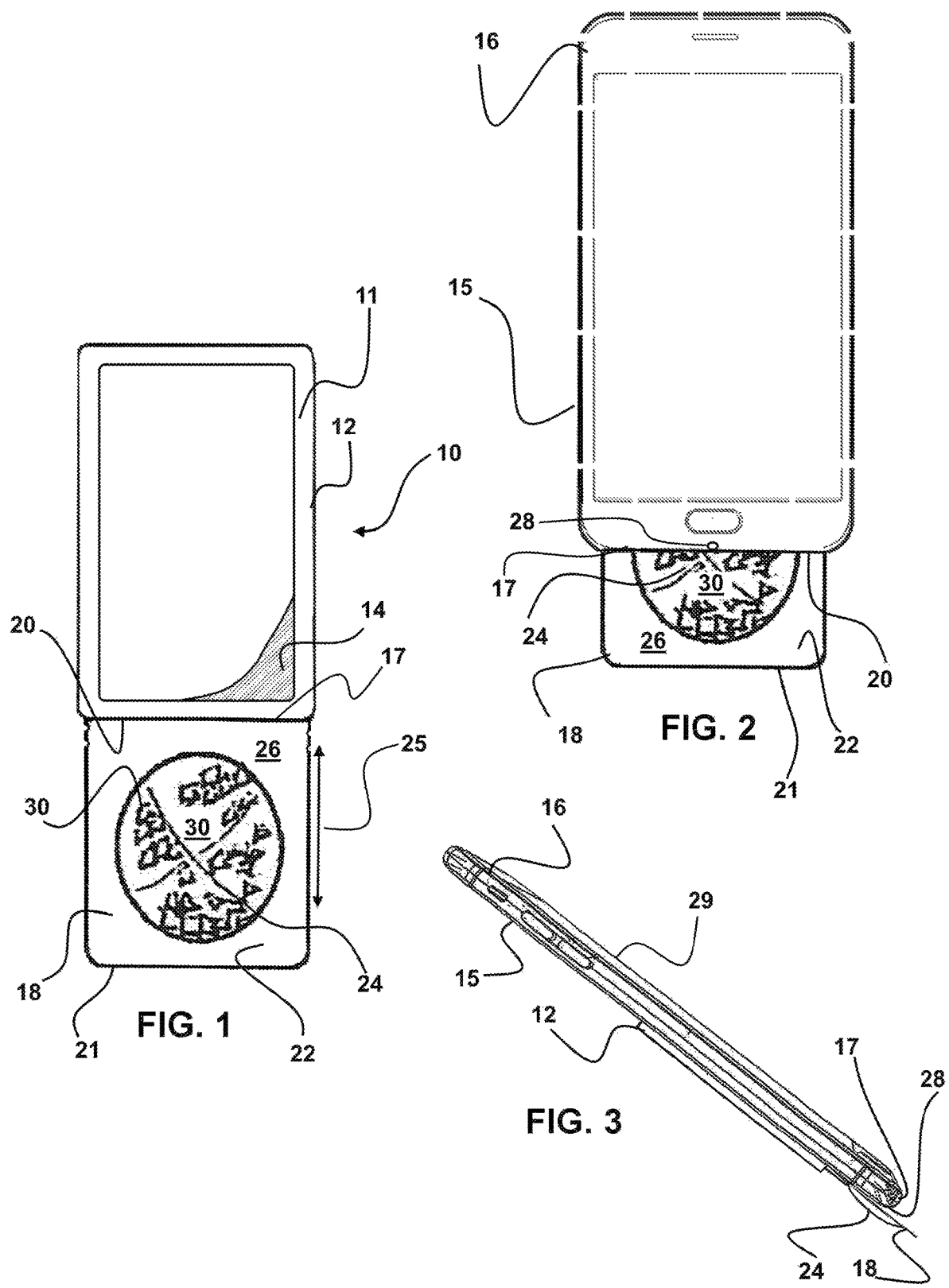

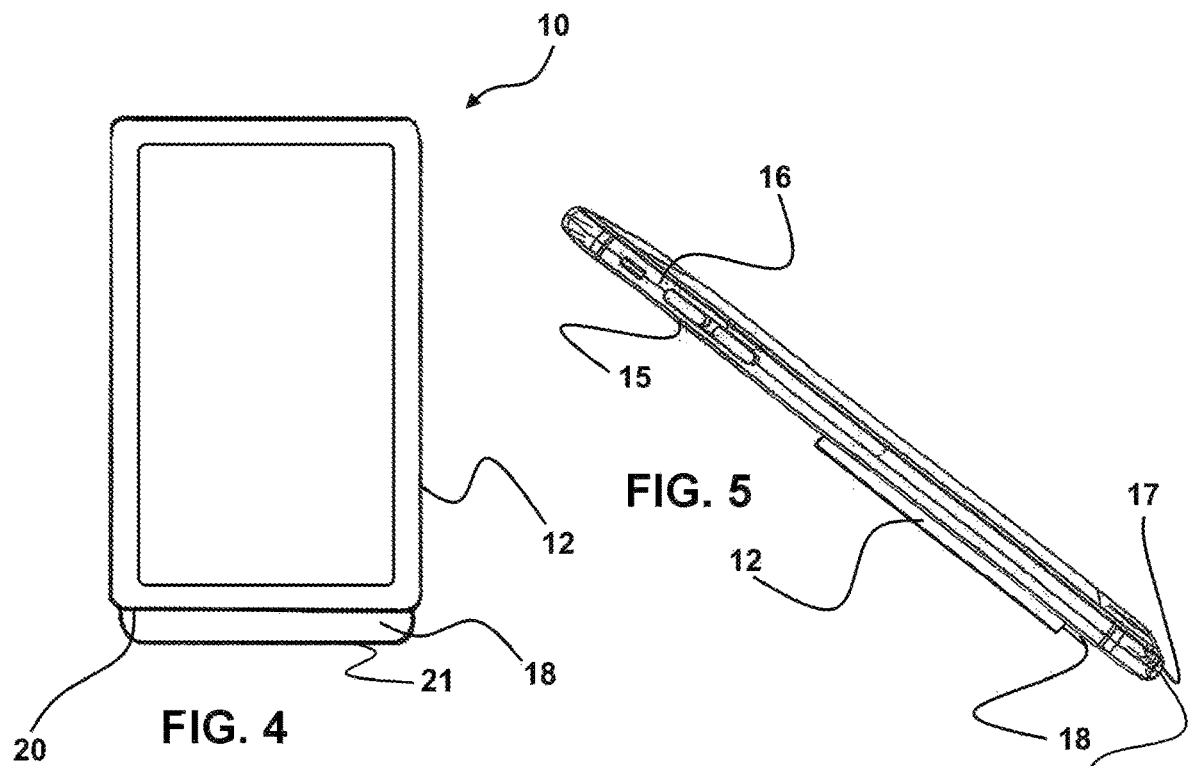
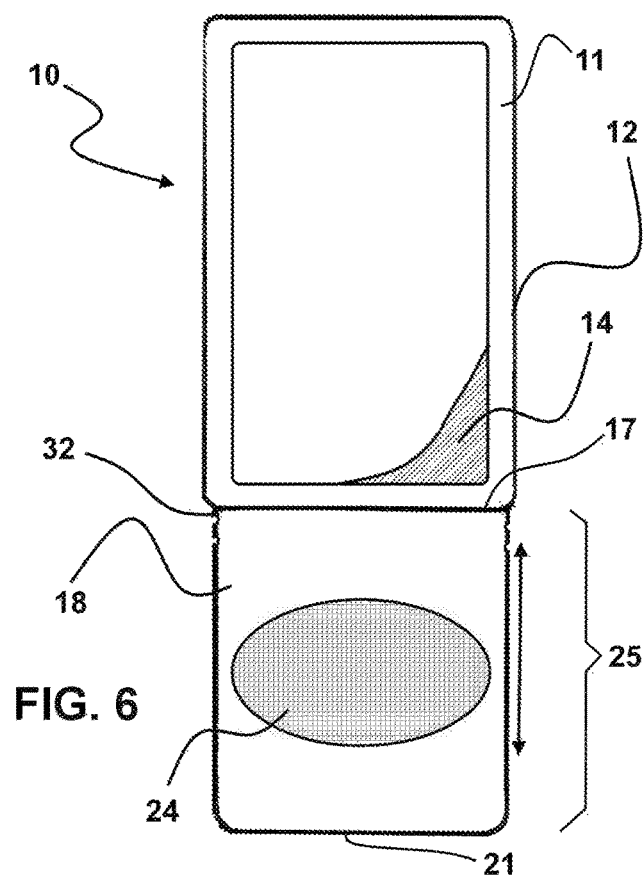

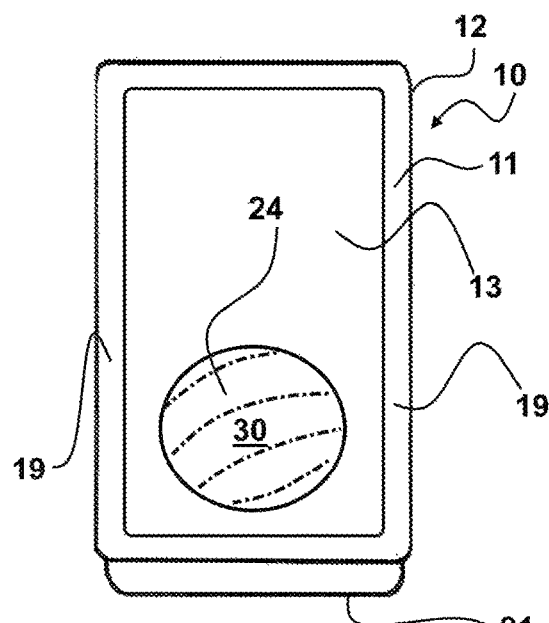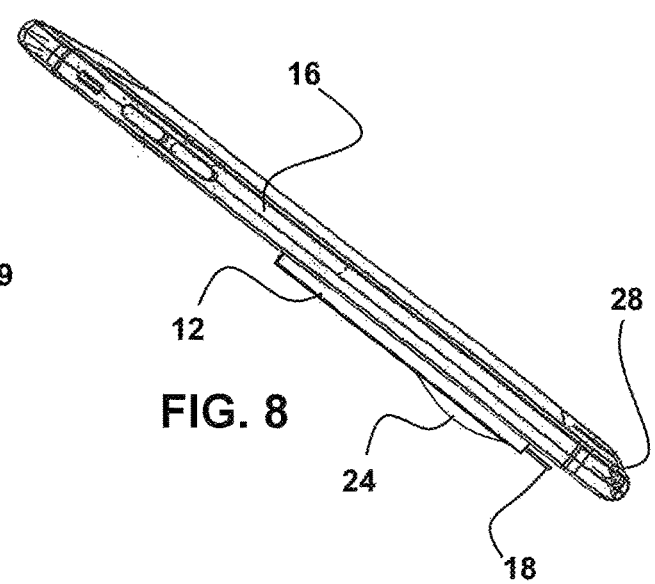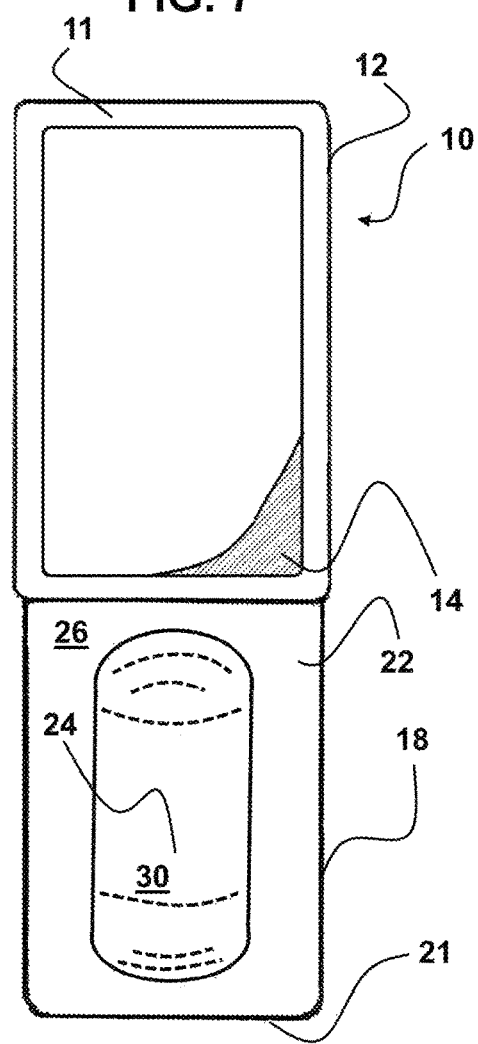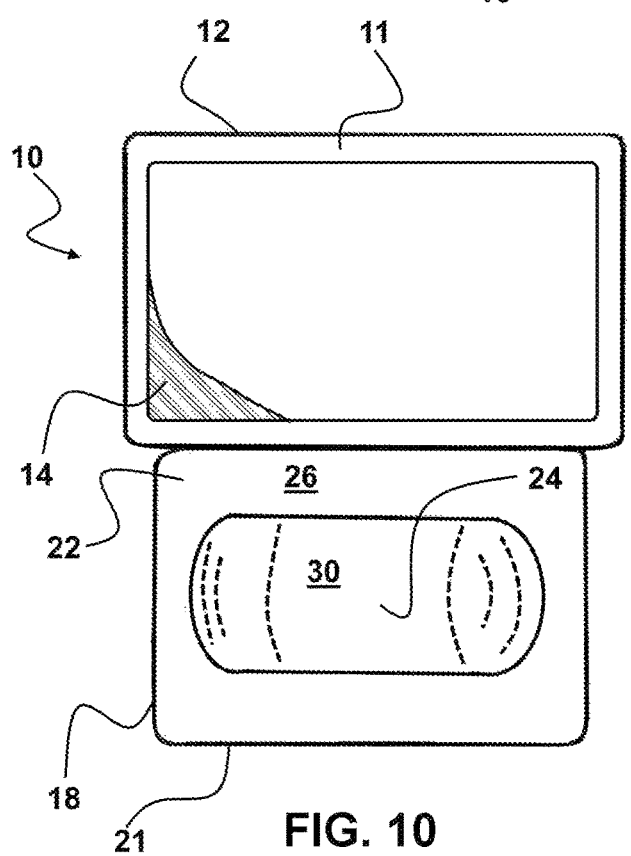
FIG. 7
FIG. 8
FIG. 9
FIG. 10

SOUND ENHANCEMENT DEVICE FOR CELL PHONE

This application claims priority to U.S. Provisional Patent Application Ser. No. 62/875,361 filed on Jul. 17, 2019 which is incorporated herein in its entirety by this reference thereto.

BACKGROUND OF THE INVENTION

1. Field of the Invention

The present invention relates to cellular phones and more recently, smartphones. More particularly, the invention relates to an engageable sound focusing component adapted for sliding once mounted on the rear surface of a smartphone, which serves to focus the voice of the user into a conventional surface-positioned microphone on such smartphones.

2. Prior Art

Modern cellular phones have evolved into smartphones which provide the user with a large LCD display on a front surface of the phone. This display serves as a computer display for webpages and documents and the like, which would normally be displayed on a desktop or laptop computer. Consequently, such smartphone displays are evolved to be ever-larger, to provide the user with more display space to more easily view documents, webpages, maps, and other computer generated imaging.

With the enlargement of such LCD displays on smartphones to maximize their position on the front side of a phone case, manufacturers have had to reposition the other components of the phone. Consequently, the microphone which is employed by the user to speak through during phone calls, has been moved to a location on a bottom edge of the smartphone, or more frequently, to the rear surface of the body of the smartphone adjacent the bottom edge.

With the microphone positioned on the back surface or bottom edge of the smartphone, it is out of a direct line of communication with the voice of a user holding the phone against their ear. This positioning of the microphone on the rear surface by a large portion of smartphone manufacturers has been a constant source of problems for users. A primary problem is that the smartphone user cannot be heard during a phone call because the microphone cannot pick up their voice well in a position on the rear surface of the smartphone. The problem continues to persist even with multiple efforts by manufactures to solve it, using software and even secondary microphones positioned to receive a users voice through the ear canal.

The device herein described and disclosed, provides a light weight, easy to attach, solution to the issues suffered by smartphone users with regard to poor voice transmission during a phone call. Moveable between a stowed or retracted position, and deployed position, the device features a parabolic voice reflector which functions as a lens to focus the voice of the user during phone call, directly on a rear area of the phone where such microphones are located.

The forgoing examples of related art and limitations related therewith are intended to be illustrative and not exclusive, and they do not imply any limitations on the voice focusing invention described and claimed herein. Various limitations of the related art will become apparent to those skilled in the art upon a reading and understanding of the specification below and the accompanying drawings.

SUMMARY OF THE INVENTION

The device herein disclosed and described provides a solution to the shortcomings in prior art and achieves the above noted goals through the provision of an easily attached, user deployable, voice transmission enhancing component for a smartphone. The device can be configured for positioning on any smartphone having a substantially planar rear surface.

The device features a housing which is adapted for adhesive engagement upon the rear surface of a smartphone, opposite the front surface conventionally filled by a liquid crystal display (LCD). A sound deflector is slidably engaged within a cavity of the housing. This sound deflector may be translated between a stowed position within the housing and a deployed position projecting slightly from a lower surface of the smartphone.

While the sound deflector may be substantially planar, a more preferred mode of the device herein employs a sound deflector formed of a planar body, which has a parabolic recess formed into a first surface of the planar body which faces toward the mouth of the user when in the deployed position. This parabolic recess is shaped to form a lens to focus the voice of the user toward a microphone of the smartphone conventionally positioned on a rear surface of the body of the smartphone.

The parabolic recess with the deflector in the deployed position significantly enhances the decibel level of the voice of the smartphone user, which is received by the microphone. In addition to boosting the decibel level of the voice to the microphone, it also focuses the voice projected by the user directly to the microphone, thereby also improving frequency response.

In a particularly preferred mode of the device herein, the parabolic recess may also have small recesses or dimples formed into the area of the parabolic recess. The plurality of dimples or small recesses somewhat like a golf boll exterior have shown, in experimentation, to further enhance the decibel level of the voice of the user communicated to the microphone.

With respect to the above description, before explaining at least one preferred embodiment of the herein disclosed smartphone-engageable sound transmission enhancing device in detail, it is to be understood that the invention is not limited in its application to the details of construction and to the arrangement of the components in the following description or illustrated in the drawings. The invention herein described is capable of other embodiments and of being practiced and carried out in various ways which will be obvious to those skilled in the art. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other components configured to deploy and focus the voice of a smartphone user to microphone reception, and for carrying out the several purposes of the present disclosed device. It is important, therefore, that the claims be regarded as including such equivalent construction and methodology insofar as they do not depart from the spirit and scope of the present invention.

As used in the claims to describe the various inventive aspects and embodiments, "comprising" means including, but not limited to, whatever follows the word "comprising". Thus, use of the term "comprising" indicates that the listed elements are required or mandatory, but that other elements are optional and may or may not be present. By "consisting of" is meant including, and limited to, whatever follows the phrase "consisting of". Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they affect the activity or action of the listed elements. Finally, unless provided a different respective definition, the term substantially herein means plus or minus five percent.

It is an object of this invention to provide an easily engaged sound focusing device which enhances the voice transmission of a smartphone user.

It is an additional object of this invention to provide such a voice and sound focusing device, which is user deployable whereby it may be used at the option of the smartphone user.

These and other objects of the invention will be brought out in the following part of the specification, wherein detailed description is for the purpose of fully disclosing the invention without placing limitations thereon.

BRIEF DESCRIPTION OF DRAWING FIGURES

The accompanying drawings, which are incorporated herein and form a part of the specification, illustrate some, but not the only or exclusive, examples of embodiments and/or features. It is intended that the embodiments and figures disclosed herein are to be considered illustrative rather than limiting. In the drawings FIG. 1 is an overhead view of the device herein showing a housing of the device adapted to engage with a rear surface of a smartphone using adhesive, and showing the sound deflector with a parabolic recess upon a projecting portion of a deflector which has been translated to a deployed position.

FIG. 2 shows the device as in FIG. 1, operatively engaged to the rear surface of a smartphone, and depicting the parabolic recess in the sound deflector positioned to focus the voice of the user onto the rear positioned microphone.

FIG. 3 is a side view of the device as in FIG. 2.

FIG. 4 shows the device of FIG. 1, with the planar deflector body translated to a stowed position within the housing.

FIG. 5 depicts the device as in FIG. 4, operatively deployed with an oval parabolic recess and showing side-positioned recesses which may be employed to register the deflector to any of multiple positions.

FIG. 6 depicts another mode of the device of FIG. 1, showing the projecting portion of the deflector extending between the bottom edge of the smartphone and a distal edge of the deflector having an elongated parabolic recess.

FIG. 7 depicts a mode of the device showing the housing which is U-shaped and has an open area in-between side rails which is adapted for projection of the parabolic recess therethrough.

FIG. 8 depicts the device as in FIG. 7 with the sound deflector retracted and showing the parabolic recess projecting between the rails holding the body of the deflector in a sliding engagement.

FIG. 9 shows a mode of the device with an elongated parabolic recess formed into the first surface of a projecting portion of the deflector.

FIG. 10 depicts the device having a wider configuration for the housing and the elongated parabolic recess running parallel to the long axis of the housing.

DETAILED DESCRIPTION OF THE PREFERRED EMBODIMENTS OF THE INVENTION

Figure 11:
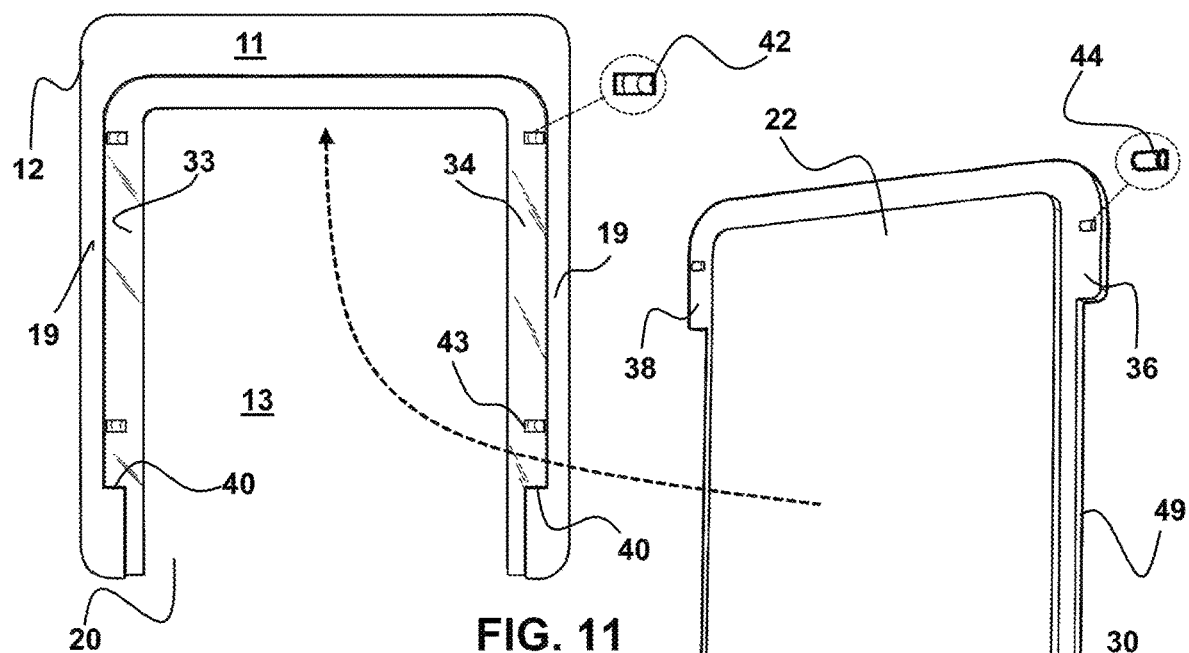
FIG. 11 depicts an exploded view of another particularly preferred mode of the device adapted for positioning in an adhesive or other engagement on the rear surface of a smartphone or smartphone case.

In this description, the directional prepositions of up, upwardly, down, downwardly, front, back, top, upper, bottom, lower, left, right and other such terms refer to the device as it is oriented and appears in the drawings and are used for convenience only. They are not intended to be limiting or to imply that the device has to be used or positioned in any particular orientation.

Now referring to drawings in FIGS. 1-13, wherein similar components are identified by like reference numerals, there is seen in FIG. 1 an overhead or plan view of the device 10. As shown, the device 10 includes a housing 12 configured to hold a sliding sound deflector 18 having a distal edge 21, between the stowed and deployed positions noted herein.

An attachment surface 11 of the housing 12 is adapted for engagement to a rear side of a smartphone 16. By engagement to a rear side of a smartphone 16 is meant herein, an attachment to a rear surface 15 of a smartphone 16 or to the rear surface of phone case engaged therewith. This rear surface 15 is located on the opposite side of the smartphone 16 from the video display 29 (as shown in FIG. 3). Currently, a preferred mode of such an attachment to the rear side of the smartphone 16, employs an adhesive 14 such as a peel and stick type of adhesive 14 surface, which is adhered to either the rear surface 15 of the smartphone 16, or the phone case engaged to the smartphone 16.

Within a cavity 20 of the housing 12 is slidably engaged the sound deflector 18 which is translatable from a retracted or stowed position, such as in FIG. 4, to a deployed position such as is shown in FIG. 2. In all modes of the device 10 herein, while in the deployed position, a projecting portion 25 of the deflector 18 extends between a bottom edge 17 of the smartphone 16, and a distal edge 21 of the deflector 18.

The deflector 18 has a body 22 which has a substantially planar first surface 26, which will function without the noted parabolic or curved recess 24 below, which is configured to help focus sound on a microphone 28 as noted herein. In a particularly preferred mode of the device 10 herein, a curved area of the surface 26, or a curved or parabolic recess 24, is formed into or by curving the first surface 26, at or adjacent to a distal edge 21 of the body 22 of the deflector. By adjacent to the distal edge 21 is meant, that the area of the curved area starts to curve at the distal edge 21 and back toward the cavity 20, or is formed into the surface 26 in a curved area having an edge of the curved areas within 1 inch to ¼ inches of the distal edge 21.

The device 10 as shown in FIGS. 2-3 is in the deployed position with the deflector 18 in the sliding engagement with the housing 12 which is adhered to or otherwise engaged to the rear surface 15 of a smartphone 16. In this deployed position, the reflective curved area 30 shown as the parabolic recess 24, is positioned such that it extends past both sides of a bottom edge 17 (FIG. 6) of the smartphone 16 to which it is operatively engaged. In this deployed position the curved area such as the parabolic surface 24 on the sound deflector 18 will serve to help reflect or redirect the sound waves of the voice of the user of the smartphone 16 toward a microphone 28. Such microphones 28 are conventionally positioned on or adjacent the bottom edge 17 of the smartphone 16 and may be visible only as a small opening communicating to the microphone. Thus, by microphone 28 used herein is meant, a microphone positioned within the phone case itself, which is in communication with an opening in the phone case. As noted, such microphones 28 are conventionally positioned on the bottom edge 17 or immediately adjacent thereto on the rear surface 16. By adjacent is meant within one inch or less of the bottom edge 17.

As shown, in the preferred mode of the device 10 the sound deflector 18 has a reflective curved area 30 shown as a parabolic recess 24, formed by or into the first surface 26 of the body 22 of the sound deflector 18. Of course, the reflective curved area 30 may also be formed by a formation of a curve of the surface 26 itself, by curving a portion of the body 22 of the deflector 18 such as in FIGS. 11-13. As such, as used herein, by reflective curved area 30 is meant, either a curved area formed into the surface 26 of the body 22 of the deflector 18, or a curving of the body 22 itself, to form an area of the surface 26, into a reflective curved area 30. Either type of reflective curved area 30 will be positioned with the deflector 18 in the deployed position, to reflect the sound waves generated by the voice of a user of the smartphone 16, back toward the microphone 28 to increase the DB of the sound waves of the voice of the user which communicate to the microphone 28. This reflective curved area 30 thus forms a reflector and lens, which upon contact with such sound waves will reflect them and focus them on the microphone 28 area of the smartphone 16.

The reflective curved area 30 shown as a curved round or elongated recess or curved parabolic recess 24, so situated during use of the device 10 in the deployed position on the smartphone 16, thus serves to gather the sound waves of the voice of the user talking, and act as a reflective lens to focus them in amplified fashion, upon the microphone 28 area of the smartphone 16. This reflection and focusing action, significantly enhances the ability to use the smartphone 16. This is especially true in a noisy environment or when the user angles the bottom edge 17 away from their face, which will normally cause their voice sound waves not to be communicated to the microphone 28, or to be very poorly communicated thereto.

As noted, the device 10 has a stowed configuration which is shown for example in FIGS. 4-5. As can be seen, the sound deflector 18, is translated back within the cavity 20 formed within the housing 12 and the distal edge 21 of the deflector 18 is positioned behind the bottom edge 17 of the smartphone 16, or barely projecting therefrom.

As shown in FIG. 6, the device 10 may be formed with differently shaped reflective curved areas 30, such a parabolic recesses 24 which are round as in FIG. 1, or more oval in circumference as shown in FIG. 6. Additionally shown in FIG. 6 are registration notches 32 which can interface with a deflecting pin located within the cavity 20, to hold the sound deflector 18 within the cavity 20. If included, the pin can also hold the length of protrusion of the sound deflector 18 from the cavity 20. This engagement of pin to notches 32 will removably maintain the deflector 18 in a deployed position to focus the voice of the user on the microphone 28. The plurality of notches 32 sequentially located along one or both edges of the sound deflector 18 body 22, will thus allow the user to pull it from the housing 12 and adjust it for the best focusing and voice transmission by the smartphone.

Figure 12:
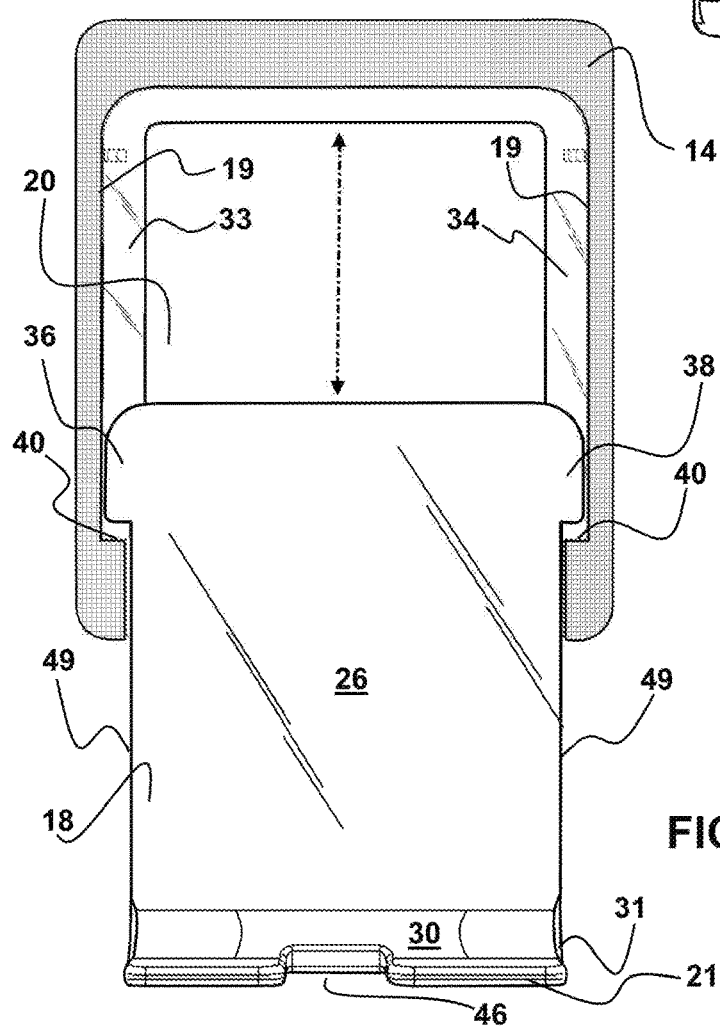
FIG. 12 shows the device as in FIG. 11 assembled to a sliding engagement.

In FIG. 7 is shown a mode of the device 10 having a housing 12 which is U-shaped such as in FIG. 11, and has an open area 13 in between parallel side rails 19 which are adapted to slidably engage with the opposing sides of the body 22 of the sound deflector 18. The adhesive 14 or other means for engagement to a phone or phone case, can be positioned on the side rails 19, instead of the central area of the housing 12 as shown in FIG. 12, or as in FIG. 1 on the surface of the housing 12 which will contact against the smartphone 16 or phone case. This configuration allows for a deeper depth of the curved reflective area 30 such as a parabolic recess 24 which extends from a rear surface of the body 22 of the deflector 18, to project through the open area 13 of the housing 12.

FIG. 8 depicts the device 10 as in FIG. 7, showing the projecting side of the parabolic recess 24 formed into the body 22 of the deflector 18, projecting from the housing 12 through the open area 13. The housing 12, as noted, is engaged to the rear of a smartphone or case, using adhesive 14 or other means to hold the housing 12 operatively engaged to the rear of the smartphone 16.

FIG. 9 shows that the reflective curved area 30 such as formed by a parabolic recess 24, may be formed in an elongated configuration and is not limited to just the circular and oval and other configurations noted above. The housing 12 can have a width such as substantially 6 centimeters and a length such as substantially 8.3 centimeters, which size it to adhere to the rear of a smartphone. As shown, the sound deflector 18 would have a width adapted for a sliding engagement into and out of the cavity 20 of the housing 12 and the width of the parabolic recess 24 along the long axis would be such that it focuses the voice to a microphone such as substantially 3 centimeters.

In FIG. 10 is depicted the device 10, configured with a wider configuration than that of FIGS. 1-9, showing the housing 12 with the deflector 18 slidably engaged therein. An elongated reflective curved area 30 of the first surface 26, is formed as an elongated parabolic recess 24 which has an axis which runs parallel to the longer axis of the housing 12.

FIG. 11 depicts an exploded view of another particularly preferred mode of the device 10 which is adapted for positioning in an adhesive or other engagement, upon a rear surface of a smartphone or smartphone case engaged therewith. As shown, the housing 12 is substantially U-shaped and has a pair of side rails 19 on opposing sides of an open area 13. A first recess 33 is formed into a first of the side rails 19 and a second recess 34 is formed into a second of the side rails 19.

The attachment surface 11 of the housing 12, which is the surface which mates to the rear of the smartphone 16 or its case, has adhesive 14 positioned thereon (FIG. 12) which may be employed to engage the device 10 to the smartphone 16 of choice.

Additionally shown in FIG. 11, is the deflector 18, which has a body 22, configured to slidably engage with the housing 12. This sliding engagement is formed between a first shoulder 36 engaged within the first recess 33 and the second shoulder 38 engaged within the second recess 34. A contact of the shoulders 33 and 38 with a recess endwall 40 formed at the open end of the housing 12, forms a limiter to the sliding of the deflector 18 toward the deployed position, thereby preventing detachment once the housing 12 in engaged to the smartphone 16 or case.

Shown in FIG. 11 also are cavities 42 which may be formed into the surface of one or both of the first recess 33 and second recess 34. These cavities 42 are shaped complimentary to one or more projections 44 extending from a surface of one or both shoulders 36 and 38. Because the body of the deflector 18 is formed of flexible material such as a polymeric material, the shoulders 36 and 38 will deflect slightly to disengage the projection 44 form the cavity 42 when the deflector 18 is pulled toward the deployed position to unlock the engagement therebetween. Thus, the projections 44 engaged in the cavity 42 will hold the deflector 18 in the stowed position. The projection 44 engaged into a second cavity 43 formed into the housing 12, will hold the deflector in the deployed position.

FIG. 12 shows the device 10 as in FIG. 11 assembled to a sliding engagement, with the deflector 18, pulled to the deployed position. This is the same configuration of the device 10 shown in FIG. 13, wherein the dotted line rectangle is provided to show the smartphone 16 from the front side on which the display 27 is located, and showing a view through the smartphone 16 of the device 10 engaged to the rear thereof as noted above.

Figure 13:
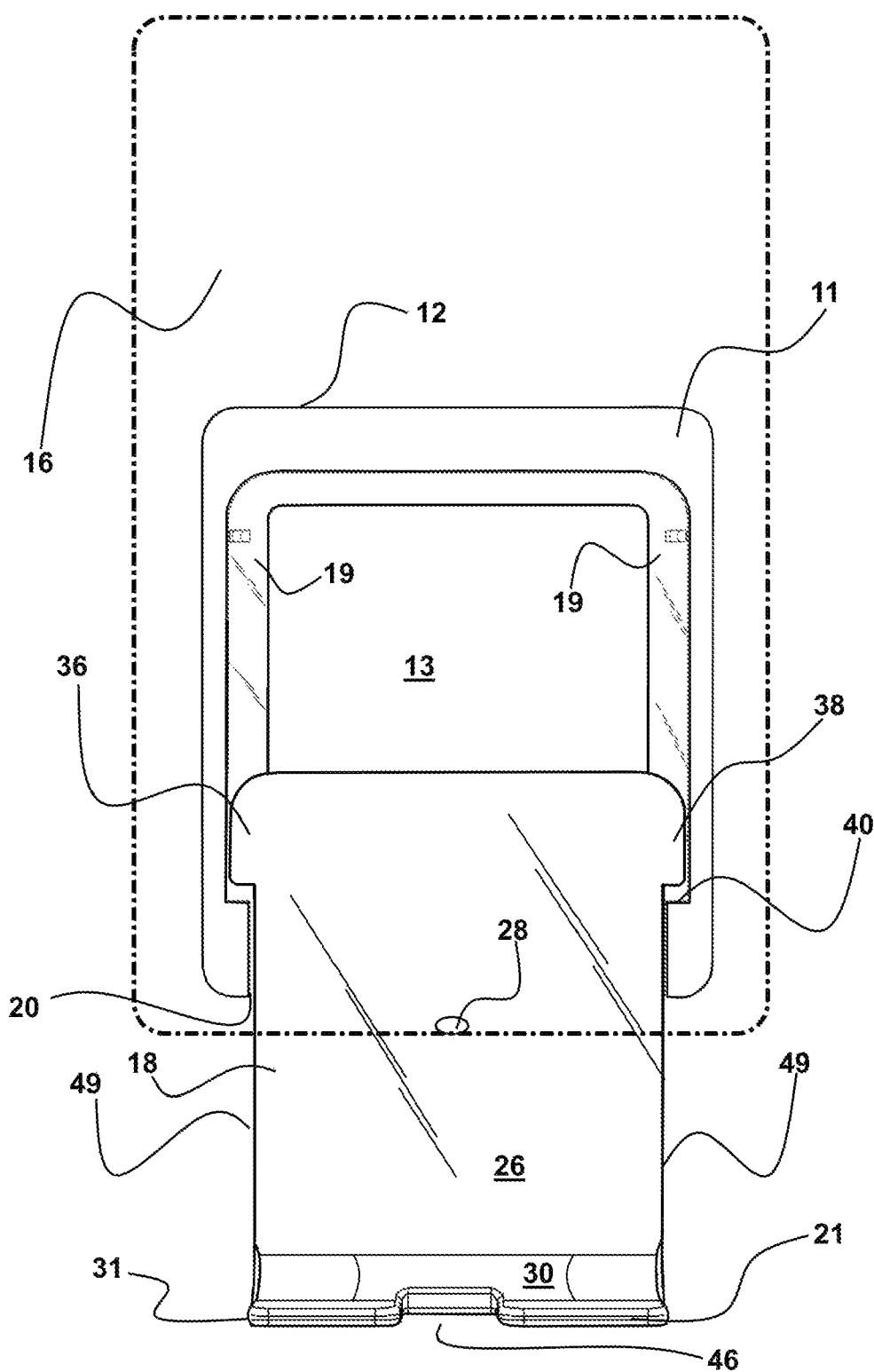
FIG. 13 depicts the assembled device of FIG. 12, in an as-used positioning of the projecting portion of the deflector, engaged to the rear surface of a smartphone or smartphone case, opposite the video display surface, as viewed from the front of such a smartphone through an outline depicting the smartphone.

In FIG. 13, is shown, the assembled device 10 of FIG. 12, in an as-used positioning engaged to the rear surface of a smartphone 16. As shown, the deflector 18 has been translated to a deployed position, and the shoulders 36 and 38 will contact the recess endwall 40 to provide a stop or limiter to that translation.

As shown, the reflective curved area 30, is formed by a curved section of the body 22 of the deflector 18, at the distal end 21 thereof forming a curved endwall 31. This curved endwall 31 forming the reflective curved area 30 on the first surface 26, is shown running substantially perpendicular to the first surface 26. However, it may run at an angle between twenty to ninety degrees relative to the planar first surface 26 and form an operative reflective curved area 30 to capture, reflect, and focus sound waves to the microphone 28.

This reflective curved area 30 as shown in FIGS. 12 and 13, is elongated and extends completely across width of the body 22 of the deflector 18 in between the side edges 49 thereof, and positions the distal 21 thereof elevated above the first surface 26 of the body 22. Thus, the reflective curved area 30 will reflect sound waves contacting it during use, back toward the microphone 28 of the smartphone 16 and enhance sound output. A notch 46 may communicate through the curved area 30 from the distal edge 21, which will provide a path for sound waves to the microphone 28 when the deflector 18 is in the stowed position. This configuration works well when the user tends to hold the phone at different angles during a conversation since the reflective curved area 30 extends the entire width of the body 22.

While all of the fundamental characteristics and features of the sound enhancing invention for a smartphone have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that various substitutions, modifications, and variations may be made by those skilled in the art without departing from the spirit or scope of the invention. Consequently, all such modifications and variations and substitutions are considered included within the scope of the invention as defined by the following claims.

What is claimed is:

1. A sound enhancing device for improving voice reception of a smartphone microphone, comprising:
   a housing having an attachment surface;
   said attachment surface configured for engagement to a smartphone rear surface or a portion of a phone case covering said rear surface;
   a deflector in a sliding engagement within a cavity of said housing, said deflector having a first surface facing toward said rear surface of said smartphone;
   said deflector movable in said sliding engagement between a stowed position and a deployed position;
   said deflector in said deployed position having a projecting portion thereof, projecting from a bottom edge of said smartphone;
   said projecting portion extending between said bottom edge of said smartphone and a distal edge of said deflector;
   a reflective curved area positioned on said first surface of said deflector; and
   said deflector in said deployed position positioning said reflective curved area to reflect sound waves contacting said reflective curved area toward a microphone of said smartphone.

2. The sound enhancing device of claim 1, additionally comprising:
   said reflective curved area positioned between said distal edge of said deflector and said bottom edge of said smartphone with said deflector located in said deployed position.

3. The sound enhancing device of claim 2, additionally comprising:
   said reflective curved area having a parabolic shape.

4. The sound enhancing device of claim 3, additionally comprising:
   said housing having a first recess positioned on a first side rail;
   said housing having a second recess positioned on a second side rail;
   said deflector having a first shoulder slidably engaged with said first recess;
   said deflector having a second shoulder slidably engaged with said second recess;
   said recess endwall positioned at one end of each of said first recess and said second recess; and
   contact of either of said first shoulder or said second shoulder with said recess endwall defining a stop, said stop limiting sliding of said deflector toward said deployed position.

5. The sound enhancing device of claim 2, additionally comprising:
   a curved section of the deflector at the distal end thereof;
   said curved section forming a curved endwall;
   said reflective curved area formed upon said curved endwall;
   said reflective surface extending upon said first surface across a width of said deflector in-between opposing side edges thereof.

6. The sound enhancing device of claim 5, additionally comprising:
   said housing having a first recess positioned on a first side rail;
   said housing having a second recess positioned on a second side rail;

said deflector having a first shoulder slidably engaged with said first recess;

said deflector having a second shoulder slidably engaged with said second recess;

said recess endwall positioned at one end of each of said first recess and said second recess; and contact of either of said first shoulder or said second shoulder with said recess endwall defining a stop, said stop limiting sliding of said deflector toward said deployed position.

7. The sound enhancing device of claim 6, additionally comprising:

a notch formed in said curved section of said deflector; and said notch aligning with said microphone with said deflector positioned in said stowed position.

8. The sound enhancing device of claim 2, additionally comprising:

said housing having a first recess positioned on a first side rail;

said housing having a second recess positioned on a second side rail;

said deflector having a first shoulder slidably engaged with said first recess;

said deflector having a second shoulder slidably engaged with said second recess;

said recess endwall positioned at one end of each of said first recess and said second recess; and contact of either of said first shoulder or said second shoulder with said recess endwall defining a stop, said stop limiting sliding of said deflector toward said deployed position.

9. The sound enhancing device of claim 5, additionally comprising:

a notch formed in said curved section of said deflector; and said notch aligning with said microphone with said deflector positioned in said stowed position.

10. The sound enhancing device of claim 1, additionally comprising:

said reflective curved area having a parabolic shape.

11. The sound enhancing device of claim 10, additionally comprising:

said housing having a first recess positioned on a first side rail;

said housing having a second recess positioned on a second side rail;

said deflector having a first shoulder slidably engaged with said first recess;

said deflector having a second shoulder slidably engaged with said second recess;

said recess endwall positioned at one end of each of said first recess and said second recess; and contact of either of said first shoulder or said second shoulder with said recess endwall defining a stop, said stop limiting sliding of said deflector toward said deployed position.

12. The sound enhancing device of claim 1, additionally comprising:

a curved section of the deflector at the distal end thereof;

said curved section forming a curved endwall;

said reflective curved area formed upon said curved endwall;

said reflective surface extending upon said first surface across a width of said deflector in-between opposing side edges thereof.

13. The sound enhancing device of claim 12, additionally comprising:

said housing having a first recess positioned on a first side rail;

said housing having a second recess positioned on a second side rail;

said deflector having a first shoulder slidably engaged with said first recess;

said deflector having a second shoulder slidably engaged with said second recess;

said recess endwall positioned at one end of each of said first recess and said second recess; and contact of either of said first shoulder or said second shoulder with said recess endwall defining a stop, said stop limiting sliding of said deflector toward said deployed position.

14. The sound enhancing device of claim 13, additionally comprising:

a notch formed in said curved section of said deflector; and said notch aligning with said microphone with said deflector positioned in said stowed position.

15. The sound enhancing device of claim 12, additionally comprising:

a notch formed in said curved section of said deflector; and said notch aligning with said microphone with said deflector positioned in said stowed position.

16. The sound enhancing device of claim 1, additionally comprising:

said housing having a first recess positioned on a first side rail;

said housing having a second recess positioned on a second side rail;

said deflector having a first shoulder slidably engaged with said first recess;

said deflector having a second shoulder slidably engaged with said second recess;

a recess endwall positioned at one end of each of said first recess and said second recess; and contact of either of said first shoulder or said second shoulder with said recess endwall defining a stop, said stop limiting sliding of said deflector toward said deployed position.

\* \* \* \* \*